US00RE34138E

United States Patent [19]

Flaig et al.

[11] E Patent Number: Re. 34,138

[45] Reissued Date of Patent: Dec. 8, 1992

[54] THROTTLE AND TIMING LINKAGE

[75] Inventors: John D. Flaig, Green Oaks, Ill.; Thomas D. Wenstadt, Cadillac, Mich.

[73] Assignee: Outboard Marine Corporation, Waukegan, Ill.

[21] Appl. No.: 71,738

[22] Filed: Jul. 9, 1987

Related U.S. Patent Documents

Reissue of:

[64] Patent No.: 4,528,953
Issued: Jul. 16, 1985
Appl. No.: 524,532
Filed: Aug. 19, 1983

[51] Int. Cl.[5] ..... F02P 5/02

[52] U.S. Cl. ..... 123/413

[58] Field of Search ..... 123/413, 395, 400, 403

[56] References Cited

U.S. PATENT DOCUMENTS

| | | | |
|---|---|---|---|
| 1,611,054 | 12/1926 | Mayoral | 123/413 |
| 2,094,860 | 10/1937 | Timian et al. | 123/413 |
| 2,635,595 | 4/1953 | Raleigh | 123/413 |
| 3,734,069 | 5/1973 | Akiyama et al. | 123/413 |
| 3,807,372 | 4/1974 | Garcea | 123/413 |

FOREIGN PATENT DOCUMENTS

| | | | |
|---|---|---|---|
| 497290 | 12/1938 | United Kingdom | 123/413 |
| 975079 | 11/1964 | United Kingdom . | |

*Primary Examiner*—Andrew M. Dolinar
*Attorney, Agent, or Firm*—Michael, Best & Friedrich

[57] ABSTRACT

A throttle and timing control for a spark ignition internal combustion engine having a fuel/air mixing device and a spark timing device. The control includes a pivot on the engine, a first lever mounted on said pivot and including a shaped cam slot a portion of which has a substantially uniform radius about the pivot. A control is connected to the lever to actuate the lever about the pivot. A second pivot on said engine spaced from but substantially parallel to the first pivot supports a second lever which has a cam follower engaged with the cam slot. A motion take-off connection on the second lever is spaced further from the second pivot than the follower so the motion imparted to the follower by movement of the cam plate is multiplied at the motion take-off point. A third pivot on the engine spaced from the first two pivots supports a third lever which is operatively connected to the timing control device. A link interconnects the first pivot and the fourth lever which is part of the throttle control.

20 Claims, 1 Drawing Sheet

THROTTLE AND TIMING LINKAGE

Matter enclosed in heavy brackets [ ] appears in the original patent but forms no part of this reissue specification; matter printed in italics indicates the additions made by reissue.

FIELD OF THE INVENTION

This invention relates to throttle and timing linkages for internal combustion engines.

BACKGROUND OF THE INVENTION

While the present invention has application to internal combustion engines used for various purposes, the following description will relate the engine primarily to an outboard motor. In conjunction with an outboard motor, the throttle push-pull cable actuates not only the butterfly valve in the carburetor(s) but is also used to adjust the timing of the spark ignition system. Since the timing is not advanced uniformly over the throttle range of the engine, but in fact is held constant over a large part of the range, the motion imparted to the timing device is presently derived from a spring loaded, lost motion system of levers. The spring loading detracts from durability and requires more operating force. In order to get the desired motion without a spring load, a cam can be used. It is difficult to accommodate a large cam inside the motor cover. In many outboard motors the timing lever and the throttle lever are desireably on pivot axes 90° apart which raises problems in transferring motion from the cam slot to the throttle. It is desirable to both reduce the space required for the apparatus and to also provide a more reliable cam and follower arrangement than found in the art.

Attention is directed to U.S. Pat. Nos. 1,611,054, 2,635,595, 3,734,069 and British Pat. No. 975,079. These patents do not teach the present linkage.

SUMMARY OF THE INVENTION

This invention provides a throttle and timing control for a spark ignition internal combustion engine having a fuel/air mixing device and a spark timing device. The control includes a pivot on the engine, a first lever mounted on said pivot and including a shaped cam slot a portion of which has a substantially uniform radius about the pivot while the radius of the remainder of the slot is not uniform. A control is connected to the lever to actuate the lever about the pivot. A second pivot on said engine spaced from but substantially parallel to the first pivot supports a second lever which has a cam follower engaged with the cam slot. A motion take-off connection on the second lever is spaced further from the second pivot than the follower so the motion imparted to the follower by movement of the cam plate is multiplied at the motion take-off point. A third pivot on the engine spaced from the first two pivots supports a third lever which operatively controls the timing of the spark ignition system. A fourth pivot on the engine spaced from the first three pivots supports a fourth lever which is operatively connected to the fuel/air metering device. Links interconnect the second lever with the third lever and the first lever with the fourth lever.

Another feature of this invention is to provide a control as just described in which the connection at each end of a link accommodates a change of the pivot axis angle of one lever relative to the associated lever.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DETAILED DESCRIPTION OF THE DRAWINGS

Figure 1:
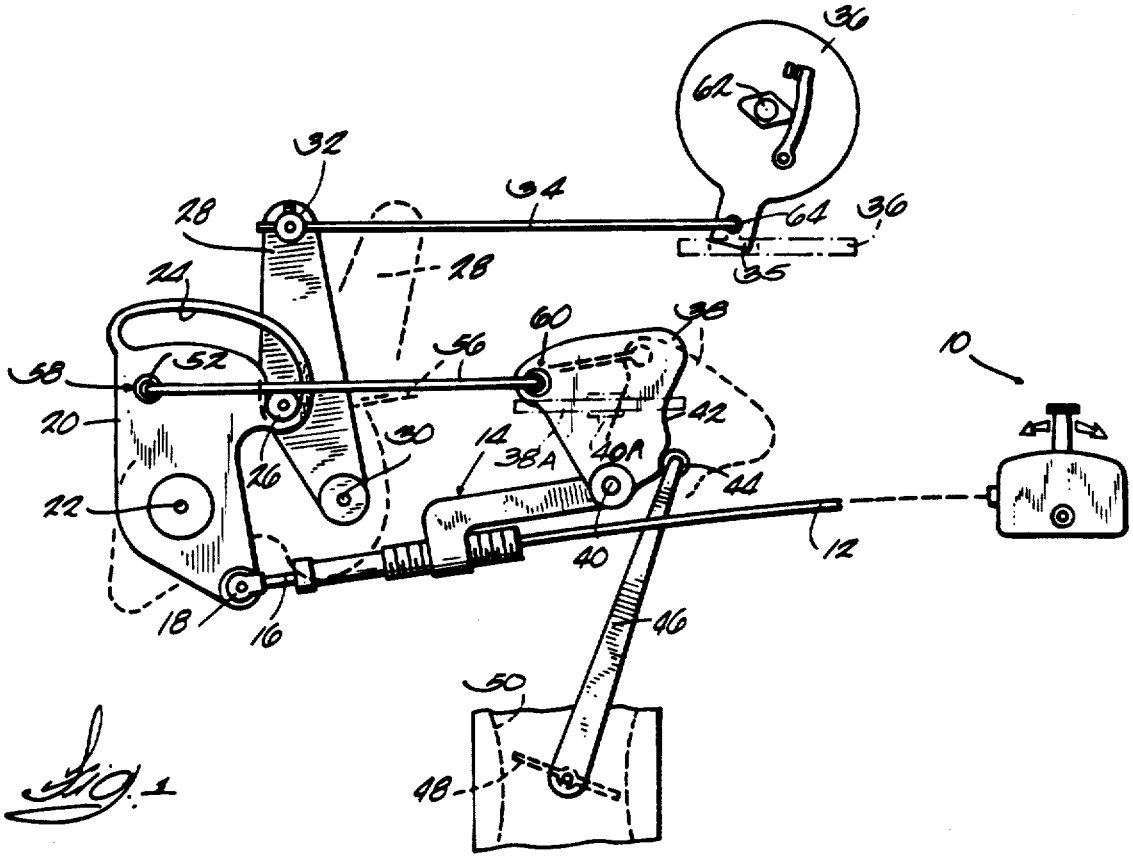
FIG. 1 is a schematic showing of the throttle and timing linkage.

When the operator of the boat actuates the throttle control 10, the push-pull cable 12 is actuated. The cable is anchored at clamp 14 which is fixed to the engine block or other suitable place. The operating wire 16 of the push-pull cable is connected at 18 to first lever 20 pivotally mounted at 22 on the engine block. Lever 20 is somewhat like a plate and has a cam slot 24 located further from the pivot 22 than is the connection point 18 between the lever and the push-pull cable. Thus, the motion at the cam slot 24 is multiplied.

A portion of the cam slot is generated at a constant radius about the center of pivot 22 so follower 26 is retained in a fixed position when the lever moves. But when the follower is in that portion of the slot in which the radius is not uniform the follower must move. The follower 26 is mounted on a second lever 28 pivoted at 30. The follower 26 is a simple roller and, since the axes of the two pivots 22 and 30 are parallel, the follower need only accommodate motion in one plane, providing straight rolling action with line contact between the follower and the cam.

The distal end of the second lever 28 is connected at 32 to a rod or link 34 which in turn is connected to lever arm 35 to actuate the timing device (a third lever) 36 to advance or retard the spark timing as dictated by the shape of the cam slot 24. Device 36 is a schematic representation of a timing rotor which has a recognizeable form but which in contemporary engineering would more likely be a device for positioning a trigger coil relative to a rotating magnet to change the spark timing. The motion imparted to the roller/follower 26 is multiplied at 32 since the distance of the connection point 32 is substantially greater than the distance to the follower 26 from the pivot 30. Thus, the motion imparted by the push-pull cable to the first lever at point 18 is multiplied to the slot and then that motion is multiplied again at the second lever.

The third lever 36 pivots about pivot 62, normally in a plane at about 90° to the plane in which the first two levers move. For simplicity of understanding the mechanism, all levers are shown in the same plane but as shown in dotted lines the lever 36 could be in another plane at 90° and pivot about pivot 62. This lever forms the spark ignition timer base and when rotated, varies spark timing.

A fourth lever 38 pivots about pivot 40, normally in a plane parallel to the plane in which the first two levers move. For simplicity of understanding the mechanism, all levers are shown in the same plane but as shown in dotted lines the lever 38A could be in another plane at 90° and pivot about pivot 40A. This lever is provided with a shaped surface or cam 42 and roller 44 on a lever 46 follows and is actuated by the surface 42 to in turn set the butterfly valve 48 in the carburetor venturi 50.

Figure 2:
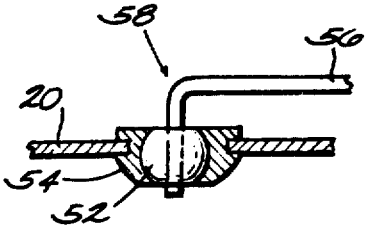
FIG. 2 is a detailed view of a type of connection which can be used in interconnecting two of the levers.

Each of the levers (20, 28, 34 and 36) is provided with a connector of the general type schematically illustrated in FIG. 2. This has a somewhat spherical plastic ball 52 retained in the associate plate by bushing 54. This permits the ball to have free motion relative to the plane of the associated lever. Therefore, a stiff wire or rod-type connector link 56 can be connected at each end to a ball 52 by pressing the end of the link 56 through the central aperture of the ball. The link 56 is connected to the first lever 20 at 58 and is connected to the fourth lever 38 at 60. These links can be shaped in any desired way to adjust and transfer the motion between the levers to which they are connected. The advantage of this arrangement is that misalignment between the levers can be readily accommodated. The present arrangement has no skidding action and is simple mechanical translation of the motion from one lever to the other.

Notwithstanding the fact that an additional lever has been provided in this arrangement, there is a cost reduction by reason of the elimination of the difficult connection between the cam slot and the fuel/air lever found in the two lever arrangement of the prior art. Furthermore, life and reliability are increased with this arrangement.

Various of the features of this invention are set forth in the following claims.

We claim:

1. A throttle and timing control for a spark ignition internal combustion engine having a fuel/air mixing device and a spark timing device, said control comprising a first pivot on said engine, a first lever mounted on said first pivot for pivotal movement in one plane and including a shaped cam slot having a first portion which has a substantially uniform radius about said first pivot and a second portion which has a non-constant radius about said first pivot, control means connected to said first lever for pivoting said first lever about said first pivot in response to movement of said control means, a second pivot on said engine spaced from but substantially parallel to said first pivot, a second lever mounted on said second pivot for pivotal movement in a plane substantially parallel to the plane of said first lever, a motion take-off connection on said second lever spaced from said second pivot, a cam follower engaged with said cam slot and mounted on said second lever between said second pivot and said motion takeoff point so that motion imparted to said cam follower by pivotal movement of said first lever is multiplied at said motion take-off point, a third pivot on the engine spaced from said first and second pivots, a third lever pivotally mounted on said third pivot and being operative to control the timing of the park timing device in response to pivotal movement of said third lever, a first link interconnecting said motion take-off point of said second lever and said third lever, a fourth pivot on said engine spaced from said first, second, and third pivots, a fourth lever pivotally mounted on said fourth pivot and operatively connected to the fuel/air mixing device, and a second link interconnecting said first and fourth levers for operating the fuel/air mixing device in response to pivotal movement of said first lever.

2. A control according to claim 1 including connection means at each end of said first and second links for accomodating multiple changes of the angle of each end of said links relative to the associated lever.

3. A control according to claim 2 wherein said second link is connected to said first lever at a different distance from said first pivot than the connection of said control means to said first lever.

4. A control according to claim 3 wherein said first and fourth levers are in planes at about 90° to each other.

5. A control according to claim 3 wherein said second and third levers are in planes at about 90° to each other.

6. A control according to claim 1 wherein said slot is at a distance further from said first pivot than the connection of said control means to said first lever.

7. A throttle and timing control for a spark ignition internal combustion engine having a fuel/air mixing device and a spark timing device, said control comprising a first member mounted on said engine for pivotal movement about a first axis and in a first plane, including a cam surface, and being adapted to be connected to a control means for pivoting said first member about said first axis in response to movement of the control means, a second member mounted on said engine for pivotal movement about a second axis spaced from but substantially parallel to said first axis and in a plane substantially parallel to said first plane and including a part spaced from said second axis, a cam follower engaged with said cam surface and mounted on said second member between said second axis and said part so that motion imparted to said cam follower by pivotal movement of said first member is multiplied at said part, a third member pivotally mounted on said engine about a third axis and operably connected to the spark timing device, a first link interconnecting said part of said second member and said third member to control the timing of the spark timing device in response to pivotal movement of said first member, a fourth member pivotally mounted on said engine about a fourth axis spaced from said first, second, and third axes and operably connected to the fuel/air mixing device, and a second link interconnecting said first and fourth members for operating the fuel/air mixing device in response to pivotal movement of said first member.

8. A throttle and timing control for a spark ignition internal combustion engine having a fuel/air mixing device and a spark timing device, said control comprising a first pivot on said engine, a first lever mounted on said first pivot for pivotal movement in one plane and including a shaped cam slot having a first portion which has a substantially uniform radius about said first pivot and a second portion which has a non-constant radius about said first pivot, control means connected to said first lever for pivoting said first lever about said first pivot in response to movement of said control means, a second pivot on said engine spaced from but substantially parallel to said first pivot, a second lever mounted on said second pivot for pivotal movement in a plane substantially parallel to the plane of said first lever, a motion take-off connection on said second lever spaced from said second pivot, a cam follower engaged with said cam slot and mounted on said second lever between said second pivot and said motion takeoff point so that motion imparted to said cam follower by pivotal movement of said first lever is multiplied at said motion take-off point, a third pivot on the engine spaced from said first and second pivots, a third lever pivotally mounted on said third pivot and being operatively connected to the spark timing device, a first link interconnecting said motion take-off point of said second lever and said third lever to control the timing of the spark timing device in response to pivotal movement of the first lever, a fourth pivot on said engine spaced from said first, second and third pivots, a fourth lever pivotally mounted on said fourth pivot and operatively connected to the fuel/air mixing device, and a second link interconnecting said first and fourth levers for operating the fuel/air mixing device in response to pivotal movement of said first lever.

*9. In a throttle and spark advance control system for an internal combustion engine having a spark advance mechanism and a throttle valve comprising an operator controlled element, a throttle control lever supported for pivotal movement about an axis and directly connected to said operator controlled element for rotation under operator control, means for positively connecting said throttle control lever to said throttle valve for positioning said throttle valve in response to movement of said throttle control lever, a spark advance control lever supported for pivotal movement about an axis, motion transmitting means for operatively connecting said spark advance control lever to said throttle control lever for pivotal movement of said spark advance control lever about its axis in response to pivotal movement of said throttle control lever about its axis and said spark control lever to said spark advance mechanism for controlling the position of said spark advance mechanism in response to the position of said throttle control lever, the improvement comprising said motion transmitting means effecting pivotal movement of said spark control lever at a different angular velocity than that of said throttle control lever during at least a range of angular movement of said throttle control lever, said control levers being supported for pivotal movement with their axes being juxtaposed to but offset from each other, said levers being in superimposed relationship with one of said control levers lying over the other of the control levers said motion transmitting means for operatively connecting the control levers comprising a slot formed in one of said control levers and follower means received in said slot for controlling the relative movement therebetween.*

*10. In a throttle and spark advance control system as set forth in claim 9 wherein the means for effecting pivotal movement of the spark advance control lever is further operative to effect pivotal movement of the spark advance control lever at a different angular velocity than the first mentioned angular velocity during another range of movement of the throttle valve control lever.*

*11. In a throttle and spark advance control system as set forth in claim 10 wherein the different angular velocity of the spark control lever comprises a dwell period when the spark control lever is not moved during rotation of the throttle control lever.*

*12. In a throttle and spark advance control system as set forth in claim 10 wherein the different angular velocity effects movement of the spark control lever at a slower rate relative to the first mentioned angular velocity during the throttle control lever movement.*

*13. A system as set forth in claim 9 wherein said operator controlled element includes a cable connected directly to said throttle control lever.*

*14. A system as set forth in claim 9 wherein said throttle valve pivots about a throttle valve axis spaced from said throttle control lever axis.*

*15. A system as set forth in claim 14 wherein said means for connecting said throttle control lever to said throttle valve includes a linkage connecting said throttle lever to said throttle valve.*

*16. A system as set forth in claim 15 wherein said linkage includes an intermediate lever having a cam surface, a cam follower which engages said cam surface and which is operatively connected to said throttle valve, and means for moving said intermediate lever in response to movement of said throttle control lever.*

*17. A system as set forth in claim 9 wherein said spark control lever has thereon a motion take-off point, wherein said means connecting said spark control lever to said spark advance mechanism is connected to said spark control lever at said motion take-off point, and wherein the distance between said follower means and said spark control lever axis is less than the distance between said motion take-off point and said spark control lever axis.*

*18. A system as set forth in claim 17 wherein said follower means is located between said spark control lever axis and said motion take-off point.*

*19. A system as set forth in claim 9 wherein said throttle control lever overlaps said spark control lever axis during at least a part of the range of motion of said throttle control lever.*

*20. An internal combustion engine comprising a spark advance mechanism, a throttle valve, an operator controlled element, a throttle control lever supported for pivotal movement about an axis and directly connected to said operator control element for rotation under operator control, means for positively connecting said throttle lever control lever to said throttle valve for positioning said throttle valve in response to movement of said throttle control lever, a spark control lever supported for pivotal movement about an axis, motion transmitting means for operatively connecting said spark control lever to said throttle control lever for pivotal movement of said spark control lever about said spark control lever axis in response to pivotal movement of said throttle control lever about said throttle control lever axis, and motion transmitting means for operatively connecting said spark control lever to said spark advance mechanism for controlling the position of said spark advance mechanism in response to the position of said throttle control lever, said motion transmitting means connecting said spark control lever to said throttle control lever effecting pivotal movement of said spark control lever at a different angular velocity than that of said throttle control lever during at least a range of angular movement of said throttle control lever, said spark and throttle control levers being supported for pivotal movement with said spark and throttle control lever axes being juxtaposed to but offset from each other, said spark and throttle control levers being in superimposed relationship with one of said spark and throttle control levers lying over the other of said spark and throttle control levers, and said motion transmitting means connecting said spark control lever to said throttle control lever comprising a slot in one of said spark and throttle control levers and follower means received in said slot for controlling the relative movement between said spark and throttle control levers.*

* * * * *